United States Patent
Neri et al.

(10) Patent No.: US 8,818,582 B2
(45) Date of Patent: Aug. 26, 2014

(54) METHOD AND SYSTEM FOR DETERMINING THE POSITION OF AN AIRCRAFT DURING ITS APPROACH TO A LANDING RUNWAY

(71) Applicants: Airbus Operations S.A.S., Toulouse Cedex (FR); Ecole Nationale de l'Aviation Civile (E.N.A.C.), Toulouse (FR)

(72) Inventors: Pierre Neri, Tournefeuille (FR); Laurent Azoulai, Mondonville (FR); Jean Muller, Tournefeuille (FR); Christophe Macabiau, Montauban (FR)

(73) Assignees: Airbus Operations S.A.S. (FR); Ecole Nationale de l'Aviation Civile (E.N.A.C.) (FR)

( * ) Notice: Subject to any disclaimer, the term of this patent is extended or adjusted under 35 U.S.C. 154(b) by 2 days.

(21) Appl. No.: 13/621,313

(22) Filed: Sep. 17, 2012

(65) Prior Publication Data

US 2013/0079958 A1 Mar. 28, 2013

(30) Foreign Application Priority Data

Sep. 22, 2011 (FR) .................................... 11 58446

(51) Int. Cl.
| | | |
|---|---|---|
| G06F 19/00 | (2011.01) | |
| G06G 7/70 | (2006.01) | |
| G01C 23/00 | (2006.01) | |
| G05D 1/00 | (2006.01) | |
| G05D 3/00 | (2006.01) | |
| G06F 7/00 | (2006.01) | |
| G06F 17/00 | (2006.01) | |
| G01S 19/28 | (2010.01) | |
| G01S 19/15 | (2010.01) | |
| G01S 19/20 | (2010.01) | |

(52) U.S. Cl.
CPC ................. *G01S 19/28* (2013.01); *G01S 19/15* (2013.01); *G01S 19/20* (2013.01)
USPC .......... 701/16; 701/3; 701/11; 701/17; 701/18

(58) Field of Classification Search
CPC .......... G01S 19/28; G01S 19/20; G01S 19/15
USPC ........................................ 701/16, 11, 17, 18
See application file for complete search history.

(56) References Cited

U.S. PATENT DOCUMENTS 5,343,395 A * 8/1994 Watts ............................... 701/16
5,702,070 A * 12/1997 Waid ............................. 244/183

(Continued)

FOREIGN PATENT DOCUMENTS

EP 1965219 A1 9/2008

*Primary Examiner* — Calvin Cheung
*Assistant Examiner* — Paula L Schneider
(74) *Attorney, Agent, or Firm* — Lerner, David, Littenberg, Krumholz & Mentlik, LLP

(57) ABSTRACT

A method for guiding an aircraft during its final approach to a landing runway, whereby the aircraft is guided during its approach by aircraft position information obtained from an GNSS satellite navigation system, wherein: prior to the start of the final approach a first time $t_{FAF}$ is determined corresponding with the start of said final approach and a second time $t_{TD}$ corresponding with the landing of the aircraft on said runway, then a set of satellites is determined of the satellite navigation system for excluding from the calculation of said aircraft position information during at least a part of the time interval comprised between said first and second times; and during the final approach, the aircraft position information is determined while excluding the information corresponding with all the satellites of said set of satellites and the aircraft is guided along its final approach path by said position information.

13 Claims, 3 Drawing Sheets

(56) References Cited

U.S. PATENT DOCUMENTS

| | | | |
|---|---|---|---|
| 5,955,971 A * | 9/1999 | Uemura | 340/947 |
| 6,067,484 A * | 5/2000 | Rowson et al. | 701/16 |
| 6,178,363 B1 * | 1/2001 | McIntyre et al. | 701/16 |
| 6,239,745 B1 * | 5/2001 | Stratton | 342/410 |
| 6,707,422 B2 * | 3/2004 | Sheynblat et al. | 342/357.25 |
| 6,825,805 B2 * | 11/2004 | Rowitch | 342/357.25 |
| 6,944,541 B2 * | 9/2005 | Pasturel et al. | 701/476 |
| 8,170,727 B2 * | 5/2012 | Deker | 701/3 |
| 8,416,100 B2 * | 4/2013 | Azoulai | 340/945 |
| 8,489,261 B2 * | 7/2013 | Albert et al. | 701/16 |
| 8,660,722 B2 * | 2/2014 | Dumoulin et al. | 701/16 |
| 2005/0182530 A1 * | 8/2005 | Murphy | 701/16 |
| 2007/0090993 A1 * | 4/2007 | Arethens | 342/357.03 |
| 2009/0069960 A1 * | 3/2009 | Lapp et al. | 701/16 |
| 2011/0066307 A1 * | 3/2011 | Hiebl | 701/16 |
| 2011/0184595 A1 * | 7/2011 | Albert et al. | 701/16 |
| 2011/0231038 A1 * | 9/2011 | Studenny et al. | 701/17 |
| 2013/0044025 A1 * | 2/2013 | Chiu | 342/357.25 |
| 2013/0050018 A1 * | 2/2013 | Jeong et al. | 342/357.25 |
| 2013/0162468 A1 * | 6/2013 | Kim et al. | 342/357.25 |

\* cited by examiner

METHOD AND SYSTEM FOR DETERMINING THE POSITION OF AN AIRCRAFT DURING ITS APPROACH TO A LANDING RUNWAY

FIELD OF THE INVENTION

The present invention relates to the domain of aircraft navigation and more particularly to a method for determining the calculated position of an aircraft, based on GNSS satellite navigation ("Global Navigation Satellite System" in English), such as GPS, during the final approach phase of a precision approach in automatic mode, leading to an automatic landing also called "autoland" in Anglo-Saxon terminology. The invention is more particularly related to a method and device for determining position information of the aircraft during said final approach, so that the lateral and vertical deviation information supplied to the automatic pilot and specifically to the guidance laws of precision approach, will not result in jumps which could affect the performance of the automatic approach and landing.

BACKGROUND OF THE INVENTION

In the domain of civil aviation, landing assistance systems exist allowing an aircraft to fly precision approach operations. These systems provide an indisputable operational benefit by guiding the aircraft in reliable manner, thanks in particular to vertical guidance up to a decision height corresponding with minimum heights, in general less than or equal to 200 feet (approximately 60 meters), in function of the category (cat-I to cat-III) of the intended precision approach.

These minimum heights are even zero for category Cat-IIIC approaches. Some of said approaches can end in an entirely automatic landing. The main existing landing assistance systems, used for executing precision approaches, are ILS ("Instrument landing System" in English) and MLS ("Microwave Landing System" in English). These landing assistance systems are relying on one or more ground stations dedicated to this function and on means, aboard the aircraft, for receiving the signals emitted by said ground stations.

Landing assistance systems also exist using aircraft position information determined by means of a GNSS satellite positioning system, in which said position is compared with a reference path corresponding with the anticipated approach. The precision, the integrity, the continuity and the availability of the position information used by said landing assistance systems can be improved by so-called augmentation techniques. These techniques were defined in particular by the OACI ("International Civil Aviation Organization"). It is for instance possible to use GBAS type augmentation ("Ground based Augmentation System" in English), as in the GLS landing assistance system ("Ground based augmentation landing System" in English), in order to carry out precision approaches.

One future objective is to be able to execute precision approaches, which could include automatic landing, in any type of airport, therefore also in airports not equipped with ground stations, such as for instance the stations used for ILS or MLS systems. For this purpose, it will be necessary to use landing assistance systems using aircraft position information determined starting from a GNSS type satellite positioning system, and augmentation techniques which do not necessarily rely on ground stations inside the airport. These augmentation techniques can be, for instance, SBAS type techniques ("Satellite Based Augmentation System" in English) or ABAS type techniques ("Airborne Based Augmentation System" in English) defined by the OACI. This last type of augmentation relies in particular on RAIM type techniques ("Receiver Autonomous Integrity Monitoring" in English) and/or AAIM type techniques ("Aircraft Autonomous Integrity Monitoring" in English). SBAS type augmentations can be implemented by means of systems such as WAAS ("Wide Area Augmentation System" in English) in the USA, or EGNOS ("European Geostationary Navigation Overlay System" in English) in Europe.

In the approaches relying on landing assistance systems using aircraft position information determined starting from a GNSS type satellite positioning system, said position information is calculated in 3 dimensions starting from distance measurements, called pseudo distance between GNSS satellites and one or more GNSS receivers on board of the aircraft. The performance and the behavior in time of the GNSS position in 3 dimensions depend on different error contributors linked to the satellite constellation, the propagation effects of the GPS signal through the atmosphere and the quality of the receiver on the one hand, and on the GNSS constellation geometry on the other hand. For instance, in the case of the existing GPS constellation, a user receiver sees satellites rising and/or setting as result of their orbit around the earth, whereby the orbit consists of one revolution in 23 hours and 56 minutes. A satellite can also be removed from the calculation of the GPS based position because of a defect of said satellite detected by the receiver thanks to an augmentation system such as SBAS, GBAS or ABAS. This addition or removal of one or more satellites in the calculation of the aircraft position, during the approach, can create position jumps of a few meters. These position jumps, which are acceptable in the context of approaches limited to a decision height, for instance of 200 feet (approximately 60 meters), might not be acceptable for precision approaches with lower decision height, in particular in case of automatic landing. In fact, given the required high performance for guiding an automatic landing, it is necessary to know with great precision (a few meters) the position of the aircraft and a position jump could be assimilated with a strong bias, which in some cases might not be acceptable.

BRIEF SUMMARY OF THE INVENTION

An aspect of the present invention is to remedy at least some of the aforementioned disadvantages. It relates to a method for guiding an aircraft in its the approach to a landing runway, whereby said approach was selected in advance and during said approach the aircraft is guided by means of aircraft position information obtained from at least one GNSS satellite navigation system.

This system is remarkable in that:
prior to the final approach corresponding with said approach, the following occurs in automatic manner:
  a) a first time $t_{FAF}$ is determined corresponding with the start of said final approach;
  b) a second time $t_{TD}$ is determined corresponding with the landing of the aircraft on said runway; and
  c) a set of satellites is identified of said satellite navigation system that will be excluded from the calculation of said aircraft position information during at least a part of the time interval comprised between said first and second times;
during said final approach, the following steps are carried out in automatic and iterative mode:
  d) said aircraft position information is determined by excluding information originating from all satellites of said set; and e) the aircraft is guided along its final path by means of said position information.

This method offers the advantage of avoiding jumps in the value of said position due to the exclusion of a satellite relative to the aircraft during the final approach, since the satellites that are excluded during this final approach are not taken into account, from the beginning of the final approach, for the calculation of the aircraft position.

By preference, the satellite set determined in step c) corresponds with the satellites that will be setting relative to the aircraft, during said time interval. In this way, a jump in the value of the position is avoided due to a satellite setting relative to the aircraft during the final approach.

By preference, still, in step d), satellites that will rise relative to the aircraft during said time interval, are also excluded from the calculation of the aircraft position information. In this way, a jump is avoided in the value of said position due to a satellite rising relative to the aircraft during the final approach.

In a particular implementation mode, the two following equations are used in order to determine whether a satellite Si will be setting relative to the aircraft, during said time interval:

$$\alpha = \frac{\theta^i(k) - \theta^i(k-1)}{t(k) - t(k-1)}$$

where:
t(k) is the actual time;
t(k−1) is a time preceding the actual time
$\theta^i(k)$ is the elevation angle of the satellite Si relative to the aircraft at time t(k);
$\theta^i(k-1)$ is the elevation angle of the satellite Si relative to the aircraft at time t(k−1);
and $$t^i_{set} = \frac{\theta_{mask} - \theta^i(k)}{\alpha} + t(k)$$

where:
$t^i_{set}$ is the setting time of the satellite Si;
$\theta_{mask}$ is the masking angle selected for the satellite navigation system to which satellite Si belongs;
and if time $t^i_{set}$ belongs to time interval [$t_{FAF}$; $t_{TD}$] it is assumed that satellite Si will be setting during said time interval.

In advantageous manner, said first time $t_{FAF}$ is determined by calculating the estimated time of arrival $ETA_{FAF}$ of the aircraft in the start position of the final approach and said second time $t_{TD}$ is determined by calculating the estimated time of arrival $ETA_{TD}$ of the aircraft in the landing position on the runway.

In this case, in advantageous manner, said first and second times are calculated by using the following equations:

$$t_{FAF} = ETA_{FAF} - \Delta t_{FAF}$$

$$t_{TD} = ETA_{TD} + \Delta t_{TD}$$

where $\Delta t_{FAF}$ and $\Delta t_{TD}$ are predetermined time margins.

In a preferred implementation mode, said aircraft position information is obtained by combining information coming from at least one GNSS satellite navigation system and at least one augmentation system. Said at least one augmentation system can be in particular a SBAS, ABAS or GBAS type system. The use of information coming from an augmentation system improves the integrity of the position information. With SBAS or ABAS type systems, an approach can be carried out to an airport not equipped with ground stations.

In advantageous manner, a plurality of GNSS satellite navigation systems are used for obtaining said aircraft position information. This offers the advantage of enabling the calculation of the position information even if the number of not excluded satellites belonging to the same satellite navigation system and usable during the final approach is insufficient to calculate this position information. Indeed, the use of satellites belonging to other satellite navigation systems provides compensation for such insufficiency. In addition, even if the number of satellites is sufficient, it provides an opportunity to improve the precision, the integrity and the continuity of said position information.

The invention relates also to an aircraft comprising a system suitable for implementing the aforementioned guidance method.

The invention relates also to a guidance system of an aircraft comprising:
  means for selecting an approach in anticipation of a landing on a runway;
  means suitable for receiving signals from a GNSS satellite navigation system;
  a processing unit for calculating aircraft position information starting from said signals received from the GNSS satellite navigation system;
  aircraft guidance means, suitable for receiving from the processing unit said aircraft position information and for producing aircraft guidance signals along a final approach path corresponding with a selected approach, in function of said position information.

This system is also remarkable in that, it comprises furthermore:
  means for determining, prior to the start of the final approach, a first time $t_{FAF}$ corresponding with the start of said final approach and a second time $t_{TD}$ corresponding with the landing of the aircraft on said runway.
  means for determining, prior to the start of the final approach, a set of satellites of said satellite navigation system that will be excluded from the calculation of said aircraft position information during at least a part of the time interval between said first and second times;
  and in that, said processing unit determines the aircraft position information, during the final approach, by excluding the information originating from all the satellites of said set of satellites.

In a preferred implementation mode, the processing unit is furthermore suitable for receiving information from an augmentation system and for determining the aircraft position information starting from at least signals received from the GNSS satellite navigation system and said information received from an augmentation system In advantageous manner, this guidance system comprises means suitable for receiving signals from a plurality of GNSS satellite navigation systems, whereby the processing unit determines the aircraft position information starting from at least the signals received from said plurality of GNSS satellite navigation systems.

The invention relates also to an aircraft comprising the aforementioned guidance system.

BRIEF DESCRIPTION OF THE DRAWINGS

The invention will be better understood by reading the following description and by examining the attached figures.

DETAILED DESCRIPTION

Figure 1:
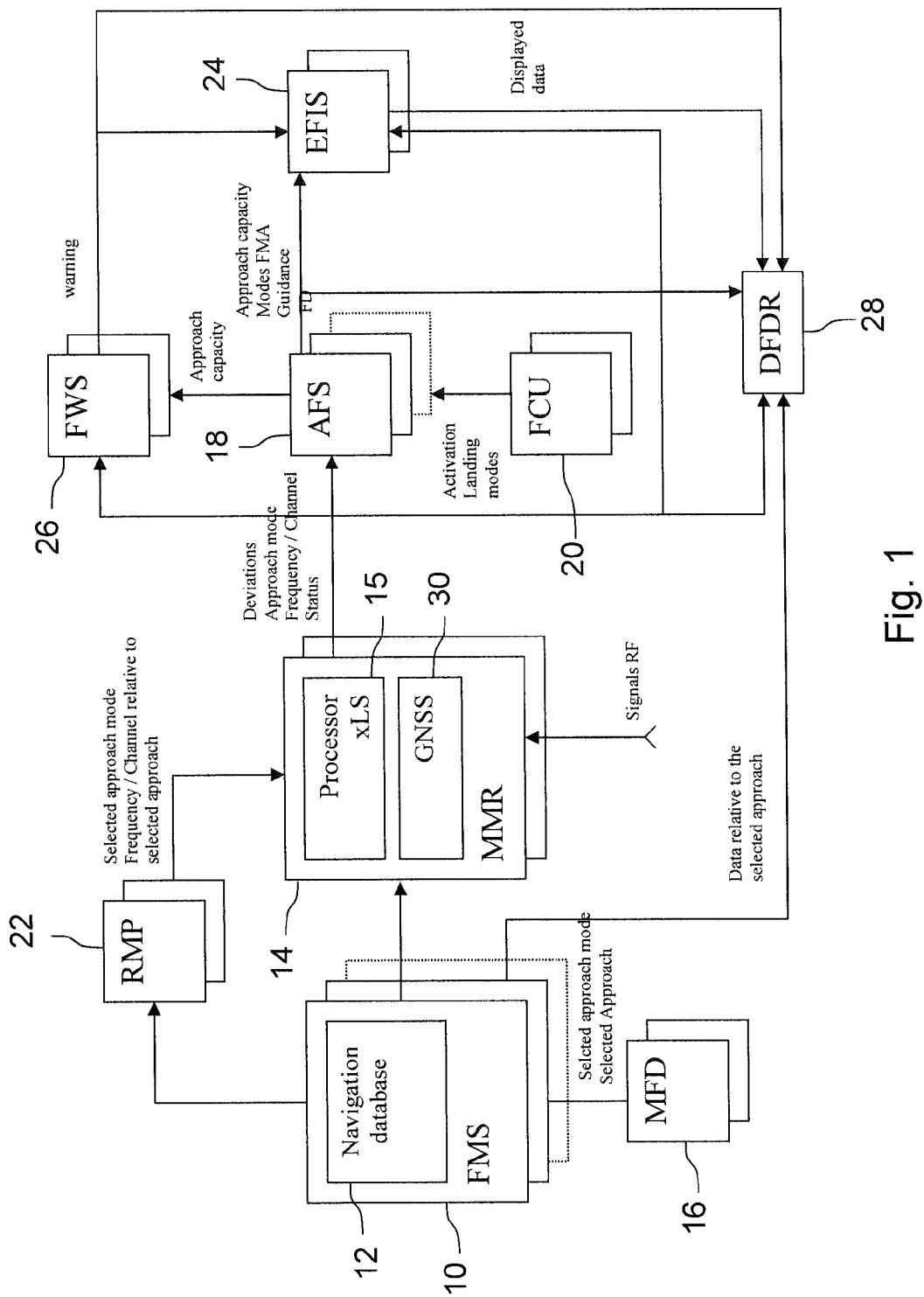
FIG. 1 is a block diagram of an aircraft guidance system according to the invention.

FIG. 1 shows an aircraft guidance system according to an embodiment of the invention. This guidance system comprises several aircraft guidance processors, in particular an FMS type ("Flight Management System" in English) flight management processor 10 and a MMR multi-mode receiver 14 ("Multi Mode Receiver" in English). This receiver 14 comprises in particular means 30 for receiving GNSS signals, for instance GPS. It comprises also one or several processors 15 supporting xLS functions available on the aircraft; the term xLS indicates in general manner the different landing assistance systems such as ILS, MLS, GLS . . .

In preferred manner, the FMS flight management processor 10 comprises a navigation information database 12. This database contains specific information relative to runway approaches. Furthermore, in known manner, the flight management processor 10 is connected to a man-machine interface 16 which is for instance an MFD type ("Multi Function Display" in English) or a MCDU type interface ("Multipurpose Control and Display Unit" in English).

The guidance system comprises also a guidance processor 18, for instance an AFS type processor ("Auto Flight System" in English) suitable for processing guidance commands for the aircraft, which can be used by the automatic pilot in automatic guidance mode or by a flight director. This guidance processor is connected to a man-machine interface 20, for instance an FCU type interface ("Flight Control Unit" in English).

In preferred manner, although not indispensable for the implementation of the invention, the guidance system can comprise furthermore:

- a RMP type ("Radio management panel" in English) radio command panel 22, which can be used by the pilot to select an approach through approach mode and the frequency (or channel) in case of defect of the MFD (or MCDU) 16 or in case of defect of the FMS processor 10;
- an EFIS type ("Electronic Flight Instrument" in English) processor 24 which corresponds with an electronic flight instrument system displayed on the display means of the aircraft;
- a FWS type ("Flight Warning System" in English) warning system 26; and
- a DFDR ("Digital Flight data Recorder" in English) recording processor 28 which corresponds with a digital flight data recorder.

In traditional manner in aeronautics, the different processors of the guidance system are by preference the object of redundancy for reasons of operational safety. For instance, the guidance system can comprise two or three FMS, two MMR, two or three AFS, two FCU, two RMP, two EFIS, two FWS and two DFDR.

The guidance system can also be implemented by means of specific processors for each function (FMS, MMR, FWS . . . ) in general called LRU ("Line Replacement Unit" in English), or in the form of an IMA type ("Integrated Modular Avionics" in English) distributed modular architecture in which the different functions are implemented in non specific processors communicating with each other.

Figure 2:
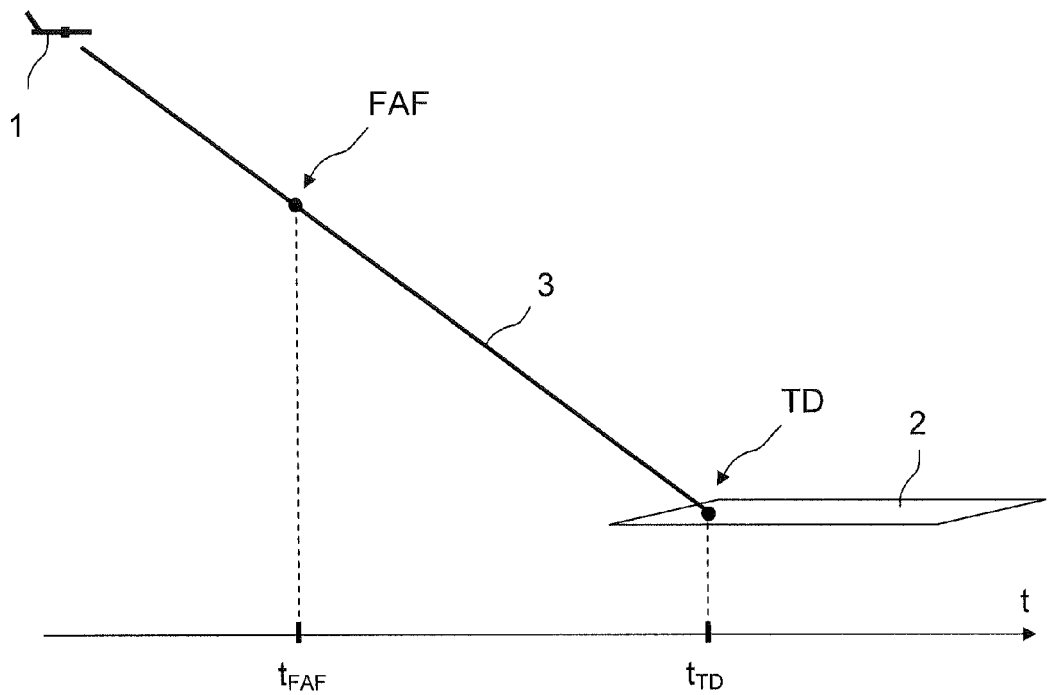
FIG. 2 is a representation of an aircraft in its final approach to the runway.

In anticipation of a landing of aircraft 1 on a runway 2 shown in FIG. 2, the aircraft pilot selects an approach to said runway among the possible approaches for this runway, which are stored in the navigation database 12 of the flight management processor 10. The pilot can select this approach by means of the MCDU Interface 16. This selection can be done either when entering the flight plan in the FMS, or during a cruising phase of the aircraft, prior to the approach. In the rest of the document, only the case is considered in which the selected type of approach is such that the guidance of the aircraft along the approach axis, in particular along the final approach axis 3, takes place by using aircraft position information obtained by means of at least one GNSS satellite navigation system.

The final approach corresponds with the portion of the approach between the FAF point ("Final Approach Fix" in English) corresponding with the start of the final approach and the TD point ("Touch Down" in English) corresponding with the landing of the aircraft on runway 2, specifically the touchdown point of the wheels of the aircraft on the runway. The FAF point is in general a predetermined point included in the navigation database 12.

According to an embodiment of the invention, prior to the start of the final approach, the following information is automatically determined:

- a first time $t_{FAF}$ corresponding with the start of the final approach, in other words the aircraft passing through point FAF; and
- a second time $T_{TD}$ corresponding with the landing of the aircraft on the runway, in point TD.

In preferred manner, the times $T_{FAF}$ and $T_{TD}$ are determined by the FMS which calculates for this, in known manner, an estimated time of arrival (called ETA, in other words "Estimated Time of Arrival" in English) of the aircraft in points FAF and TD. The FMS determines also the estimated times of arrival $ETA_{FAF}$ and $ETA_{TD}$ corresponding respectively with time $T_{FAF}$ and $T_{TD}$.

In preferred manner, still, the predetermined time margins $\Delta t_{FAF}$ and $\Delta t_{TD}$ are taken into account relative to the estimated times of arrival $ETA_{FAF}$ and $ETA_{TD}$, which eliminates the uncertainties linked to the estimation of said arrival times. The time $T_{FAF}$ and $T_{TD}$ can then be expressed by the following equations:

$$t_{FAF} = ETA_{FAF} - \Delta t_{FAF}$$

$$t_{TD} = ETA_{TD} + \Delta t_{TD}$$

As an example, said predetermined time margins $\Delta t_{FAF}$ and $\Delta t_{TD}$ can be selected in a time interval between 1 second and 30 seconds, by preference 10 seconds, in function of the accuracy of the estimated arrival times $ETA_{FAF}$ and $ETA_{TD}$.

Furthermore, always prior to the start of the final approach, a set of satellites is identified of said satellite navigation system that will be excluded from the calculation of said aircraft position information during at least a part of the time interval between said first and second times $T_{FAF}$ and $T_{TD}$. The satellites that will be excluded from said calculation correspond in preferred manner with the satellites that will be setting, relative to the aircraft, during said time interval.

Figure 3:
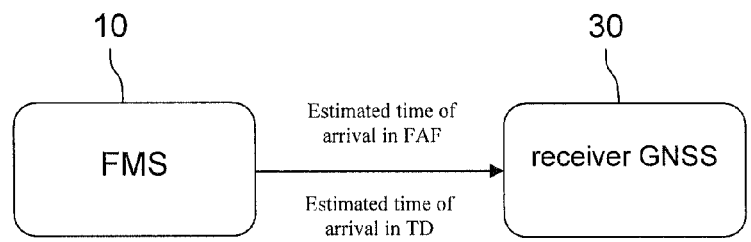
FIGS. 3 and 4 are block diagrams of sub-assemblies of the aircraft guidance system according to the invention.

In an implementation example shown in FIG. 3, the values of times $T_{FAF}$ and $T_{TD}$ are transmitted by the flight management processor 10 to the GNSS receiver 30 integrated in the multi-mode receiver MMR 14. The set of satellites of the satellite navigation system that will be excluded from the calculation of the aircraft position information is then determined by calculation means integrated in said GNSS receiver 30. For instance, these calculation means can be part of a position calculation unit 34.

In order to obtain the best possible estimate of the satellites that will be setting during said time interval, it is preferred to determine said satellite set a short time prior to the start of the final approach phase, corresponding with the aircraft passing through point FAF. For instance, the determination of said set of satellites can be done at a time between the time interval $[T_{FAF}-1\text{minute}; T_{FAF}]$.

In a particular implementation mode of the invention, to determine the set of satellites that will be setting relative to the aircraft during the time interval between $T_{FAF}$ and $T_{TD}$, the following two equations are used for each satellite Si of the satellite navigation system visible from the aircraft at the time that said satellite set is determined:

$$\alpha = \frac{\theta^i(k) - \theta^i(k-1)}{t(k) - t(k-1)} \quad \text{(equation 1)}$$

where:
t(k) is the actual time;
t(k−1) is a time prior to the actual time
$\theta^i(k)$ is the elevation angle of the satellite Si relative to the aircraft at time t(k);
$\theta^i(k-1)$ is the elevation angle of the satellite Si relative to the aircraft at time t(k−1);
and $$t^i_{set} = \frac{\theta_{mask} - \theta^i(k)}{\alpha} + t(k) \quad \text{(equation 2)}$$

where:
$t^i_{set}$ is the setting time of the satellite Si;
θmask is the masking angle selected for the satellite navigation system to which satellite Si belongs;

The actual time t(k) corresponds with the time said satellite set is determined. The preceding time t(k−1) is selected so as to provide a sufficiently significant difference of the elevation angle of the satellite in order to obtain sufficient accuracy of its variation in function of time. As non-limiting example, t(k−1) can be selected one second prior to t(k).

Figure 5:
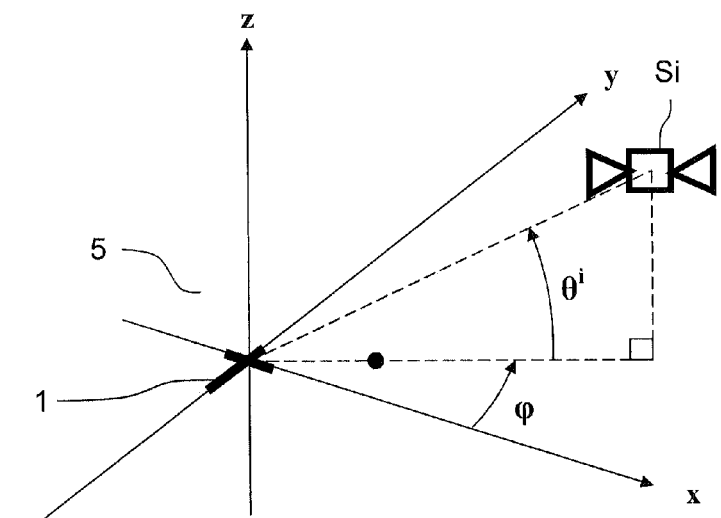
FIG. 5 shows the elevation angle of a satellite relative to an aircraft.

FIG. 5 illustrates the notion of the elevation angle θ' of a satellite Si relative to aircraft 1. For this purpose, a horizontal plane 5 is assumed located at the height of the aircraft. The x and y axes shown on the figure are included in this horizontal plane and the z axis is perpendicular to said plane. A line segment connects aircraft 1 and satellite Si. The elevation angle θ' of the satellite Si relative to the aircraft is the angle between said line segment and said horizontal plane 5. The orthogonal projection of said line segment on the horizontal plane 5 forms and angle φ relative to the x axis. The elevation angle is called sometimes site angle.

An approximation of the variation α of the satellite elevation relative to the aircraft in function of time can be calculated with equation 1. This variation α takes into account both the movement of the satellite and the movement of the aircraft. It is used in equation 2 to estimate the setting time of the satellite Si relative to the aircraft. The approximation used is based on assuming that the variation α is constant during the time interval comprised between $T_{FAF}$ and $T_{TD}$.

The masking angle $\theta_{mask}$ is the angle below which it is assumed that on the one hand, there is a risk that the signals emitted by the satellite will not be received by the aircraft, for instance due to the presence of obstacles, and on the other hand, that there is a risk that the measurements are not sufficiently accurate. In aeronautics, the value of this masking angle is usually 5 degrees for satellites of the GPS navigation system and 10 degrees for satellites of the Galileo system.

If the estimated setting time $t^i_{set}$ of the satellite Si belongs to the time interval $[t_{FAF}; t_{TD}]$ it is assumed that this satellite Si will be setting during said time interval, therefore during the final approach phase of the aircraft. Therefore, this satellite Si is added to the set of satellites that will be excluded from the calculation of the aircraft position information.

The above described implementation mode allows for determining in approximate but simple manner the setting times of satellites relative to the aircraft during the approach. In alternative manner, a determination mode can be envisioned based on calendar or ephemeris type information relative to the different satellites, for instance contained in a database, which can be used in combination with information relative to the path of the aircraft, to calculate the setting times of the different satellites relative to the aircraft.

Figure 4:
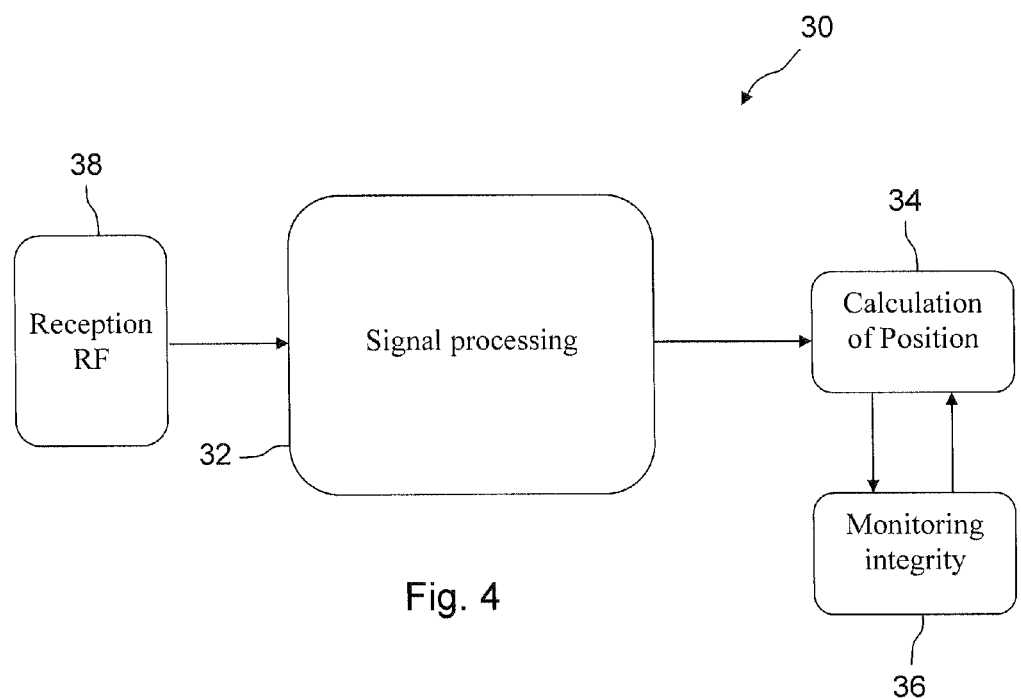

During the final approach, said position information of the aircraft is determined in iterative manner, by preference in a position calculation unit 34 of GNSS receiver 30, while excluding the information coming from the satellites belonging to the set of satellites determined prior to the start of the final approach. In this way, a jump is avoided in the value of said position, which would be due to a satellite setting relative to the aircraft during final approach, since the satellites will be setting during this final approach are excluded from the calculation of the aircraft position. FIG. 4 is a block diagram of GNSS receiver 30. A radio frequency (RF) receiver head 38 receives high frequency signals coming from different GNSS satellites (received by means of one or more antennas). The head amplifies and reduces the frequency of said signals. The signals exiting said radio frequency receiver head 38 are processed by a signal processing module 32 which calculates pseudo distance measurements for each of the GNSS satellites visible from the aircraft. The position calculation unit 34 receives these pseudo distance measurements and uses them to determine the position of the aircraft, while excluding the pseudo distance measurements corresponding with satellites belonging to said set of satellites determined prior to the start of the final approach.

In a preferred mode, are excluded furthermore from said determination the satellites that will rise relative to the aircraft, during the final approach. In this way, a jump is avoided in the value of said position due to the rising of a satellite relative to the aircraft during the final approach. This preferred mode is based on freezing, prior to the start of the final approach, a set of satellites that will be used for determining the position of the aircraft during the whole final approach.

The position information determined by the calculation unit 34 of GNSS receiver 30 is used for guiding the aircraft along its final approach path. To this end, this position information is transmitted to xLS calculator 15 which determines the deviations of the aircraft relative to the final approach path. These deviations are transmitted to the AFS guidance calculator 18 which determines the guidance instructions of the aircraft. The guidance of the aircraft according to these guidance instructions is implemented either through an automatic pilot receiving said guidance instructions, or through the pilot of the aircraft using a flight director receiving said guidance instructions.

The guidance of the aircraft along its final approach path, in function of said aircraft position information, takes place up to a decision height corresponding with the anticipated approach. This guidance can continue until automatic landing in the case of certain approaches.

In a particular implementation mode, the determination of the aircraft position information by the position calculation unit 34 takes into account, not only information coming from GNSS satellites, but also information sent from an augmentation system and processed by an integrity monitoring system 36 as shown in FIG. 4. This improves in particular the integrity of said aircraft position information.

The used augmentation technique can be a SBAS or ABAS type of technique, which improves the integrity of said aircraft position information without requiring a ground station. Nevertheless, it is also possible to use a GBAS augmentation technique which relies on ground stations.

In another particular implementation mode, the satellites providing the information used for determining said position information belong to a plurality of GNSS satellite navigation systems. The GNSS navigation systems likely to be used are for instance, and in non-limiting manner: GPS (United States), Galileo (Europe), GLONASS (Russia), Compass/Beidou (China) . . . This implementation mode offers the advantage of being able to determine the aircraft position information even if the number of non-excluded satellites belonging to one constellation of satellites, of one of the described GNSS navigation systems, is insufficient to determine said position information with the required accuracy and integrity. In fact, by combining the information coming from satellites belonging to several constellations, corresponding with different GNSS satellite navigation systems, sufficient measurements of pseudo-distances are obtained relative to these satellites to determine the aircraft position information.

The invention claimed is:

1. A method for guiding an aircraft during an approach in anticipation of landing on a runway, wherein said approach is selected in advance in the aircraft and the aircraft is guided during said approach by aircraft position information obtained from at least one GNSS satellite navigation system, wherein:
   determining in an automatic manner, prior to the start of the final approach corresponding with said approach, by a first processor in the aircraft:
   a) a first time $t_{FAF}$ corresponding with the start of said final approach;
   b) a second time tTD corresponding with the landing of the aircraft on the runway; and
   c) a set of satellites of said satellite navigation system to be excluded from the calculation of said aircraft position information during at least one portion of the time interval between said first and second times, said set of satellites determined by a GNSS receiver in the aircraft; and
   performing the following steps in an automatic and iterative manner, during said final approach,
   d) determining, by the GNSS receiver, said aircraft position information by excluding the information coming from all satellites of said satellite set; and
   e) guiding, by a second processor in the aircraft, the aircraft along the final approach path of the aircraft using said position information.

2. The guidance method according to claim 1, wherein the set of satellites determined in step c) corresponds with the satellites that will be setting, relative to the aircraft, during said time interval.

3. The guidance method according to claim 1, wherein in step d), for the determination of the aircraft position information, the satellites that will be rising, relative to the aircraft, during said time interval, are excluded.

4. The guidance method according to claim 2, wherein the determining, if a satellite Si will be setting, relative to the aircraft, during said time interval, step comprises:
   using the two following equations by the GNSS receiver:

$$\alpha = \frac{\theta^i(k) - \theta^i(k-1)}{t(k) - t(k-1)}$$

where:
   t(k) is the actual time;
   t(k−1) is a time preceding the actual time
   $\theta^i(k)$ is the elevation angle of the satellite Si relative to the aircraft at time t(k);
   $\theta^i(k-1)$ is the elevation angle of the satellite Si relative to the aircraft at time t(k−1);
and $$t^i_{set} = \frac{\theta_{mask} - \theta^i(k)}{\alpha} + t(k)$$

where:
   $t^i_{set}$ the setting time of the satellite Si;
   $\theta$mask is the masking angle selected for the satellite navigation system to which satellite Si belongs; and
   assuming, if time $t_{set}^i$ belongs to time interval $[t_{FAF}; t_{TD}]$ that satellite Si will be setting during said time interval.

5. The guidance method according to claim 1, wherein the step of determining said time $t_{FAF}$ comprises calculating an estimated time of arrival $ETA_{FAF}$ of the aircraft in the start position of the final approach and said second time $t_{TD}$ is determined by calculating an estimated time of arrival $ETA_{TD}$ of the aircraft in the landing position on the runway.

6. The guidance method according to claim 5, wherein determining said first and second times comprises using the following equations:

$$t_{FAF} = ETA_{FAF} - \Delta t_{FAF}$$

$$t_{TD} = ETA_{TD} + \Delta t_{TD}$$

where $\Delta t_{FAF}$ and $\Delta t_{TD}$ are predetermined time margins.

7. The guidance method according to claim 1, wherein the step of obtaining said aircraft position information comprises combining information originating from at least one GNSS satellite navigation system and at least one augmentation system.

8. The guidance method according to claim 7, wherein said at least one augmentation system is a SBAS or ABAS or GBAS type system.

9. The guidance method according to claim 1, wherein the step of obtaining said aircraft position information comprises using a plurality of GNSS satellite navigation systems.

10. A guidance system for an aircraft, the guidance system comprising:
   means for selecting an approach in anticipation of a landing on a runway;
   means configured for receiving signals from a GNSS satellite navigation system;
   a processing unit for determining the aircraft position information starting from said signals received from the GNSS satellite navigation system;
   an aircraft guidance means configured for receiving from the processing unit said aircraft position information and for producing signals for guiding the aircraft along a final approach path corresponding with the selected approach, in function of said position information, means for determining, prior to the start of the final approach, a first time $t_{FAF}$ corresponding with the start of said final approach and a second time $t_{TD}$ corresponding with the landing of the aircraft on said runway; and means for determining, prior to the start of the final approach, a set of satellites of said satellite navigation system to be excluded from the calculation of said aircraft position information during at least a part of the time interval comprised between said first and second times;

wherein, said processing unit is configured to determine the aircraft position information, during the final approach, while excluding the information corresponding with the satellites of said set of satellites.

11. The guidance system for an aircraft according to claim 10, wherein the processing unit is configured for receiving information from an augmentation system and for determining the aircraft position information starting at least from signals received from the GNSS satellite navigation system and said information received from an augmentation system.

12. The guidance system for an aircraft according to claim 10, further comprising means configured for receiving signals from a plurality of GNSS satellite navigation systems, whereby the processing unit is configured for determining the aircraft position information starting from at least the signals received from said plurality of GNSS satellite navigation systems.

13. An aircraft comprising a guidance system, said guidance system comprising:

means for selecting an approach in anticipation of a landing on a runway;

means configured for receiving signals from a GNSS satellite navigation system;

a processing unit for determining the aircraft position information starting from said signals received from the GNSS satellite navigation system;

an aircraft guidance means configured for receiving from the processing unit said aircraft position information and for producing signals for guiding the aircraft along a final approach path corresponding with the selected approach, in function of said position information, means for determining, prior to the start of the final approach, a first time $t_{FAF}$ corresponding with the start of said final approach and a second time $t_{TD}$ corresponding with the landing of the aircraft on said runway; and means for determining, prior to the start of the final approach, a set of satellites of said satellite navigation system to be excluded from the calculation of said aircraft position information during at least a part of the time interval comprised between said first and second times;

wherein, said processing unit is configured to determine the aircraft position information, during the final approach, while excluding the information corresponding with the satellites of said set of satellites.

* * * * *

UNITED STATES PATENT AND TRADEMARK OFFICE
CERTIFICATE OF CORRECTION

PATENT NO. : 8,818,582 B2  
APPLICATION NO. : 13/621313  
DATED : August 26, 2014  
INVENTOR(S) : Pierre Neri et al.

Page 1 of 1

It is certified that error appears in the above-identified patent and that said Letters Patent is hereby corrected as shown below:

IN THE CLAIMS  
Column 10, line 30, after "time" delete "$t_{set}^{i}$" and insert therefor --$t_{set}^{i}$--.

Signed and Sealed this  
Fifth Day of January, 2016

Michelle K. Lee  
*Director of the United States Patent and Trademark Office*